Figures 1, 2:
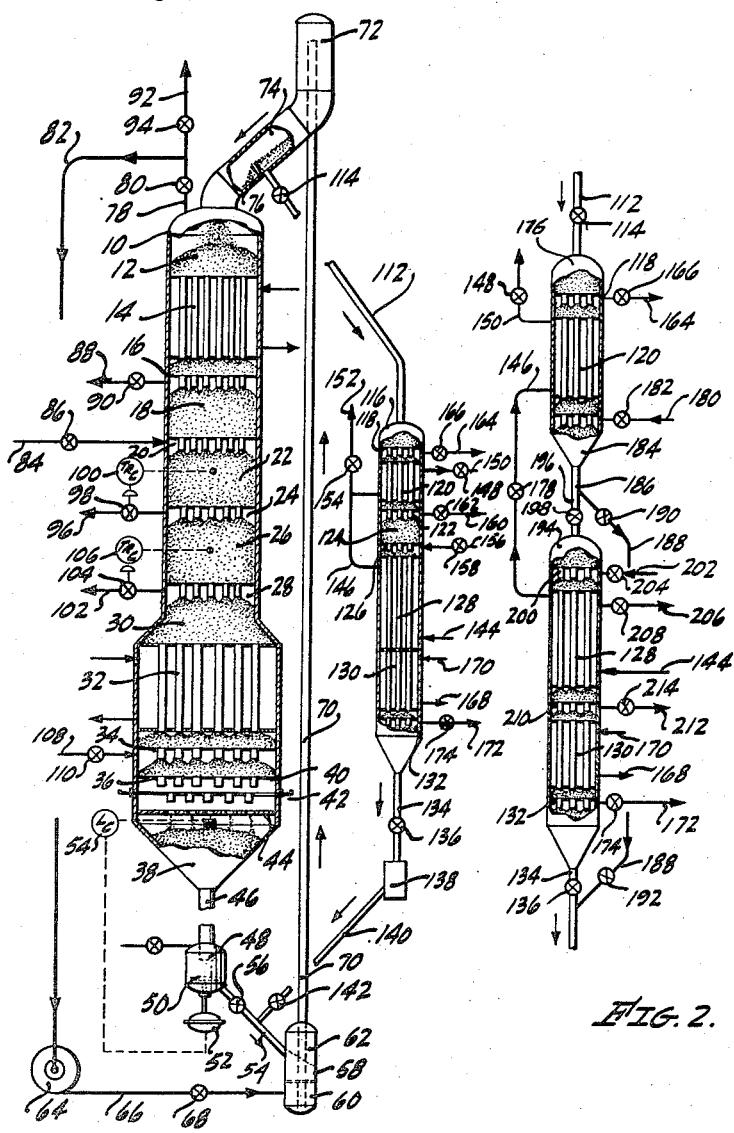

INVENTOR.
CLYDE H. O. BERG,
BY
AGENT.

Patented Oct. 26, 1954

2,692,656

UNITED STATES PATENT OFFICE 2,692,656

ADSORPTION BY AND REACTIVATION OF GRANULAR ADSORBENTS

Clyde H. O. Berg, Long Beach, Calif., assignor to Union Oil Company of California, Los Angeles, Calif., a corporation of California Application August 11, 1950, Serial No. 178,917

14 Claims. (Cl. 183—114.2)

This invention relates to the treatment of granular adsorbents and particularly relates to the maintenance of high adsorbent activity or adsorption capacity in continuous selective adsorption processes wherein a recirculating stream of granular adsorbent is continuously contacted with a fluid mixture for adsorption of a part thereof. This invention specifically relates to an improved process and apparatus for the treatment of a fraction of such a recirculating stream under certain reactivation conditions whereby accumulated contaminating substances present on the adsorbent are either desorbed at elevated temperatures or are converted to more volatile products and removed thereby raising the adsorbent activity.

In the present specification the term "adsorbent activity" is intended to mean the capacity of the adsorbent for the adsorption of a given material and it is to be differentiated from catalytic activity. Adsorbent activity is measured in terms of volumetric capacity for adsorption per unit mass of adsorbent and is expressed as cubic centimeters of adsorption capacity per gram of adsorbent.

Continuous selective adsorption processes are employed for the separation of gaseous mixtures, for the purification of liquid mixtures, and in other operations. The operational steps usually include an adsorption step wherein the fluid to be treated is contacted with a mass of adsorbent and in which at least a portion of certain constituents of the mixture, being more readily adsorbable by the adsorbent, are adsorbed thereby forming a rich adsorbent and leaving the less readily adsorbable constituents substantially unadsorbed. Subsequently the unadsorbed materials and the rich adsorbent are separated and the adsorbed constituents desorbed from the granular adsorbent thus effecting a separation. Usually in such processes the lean adsorbent produced following the desorption step is recirculated to contact further quantities of the fluid to be treated.

In most cases the fluid mixture to be treated is a complex mixture of many constituents, some of which are virtually nonadsorbable while some are very strongly adsorbed by the adsorbent. Such strongly adsorbed materials are ordinarily constituents of relatively high molecular weight or high boiling point compared to the other components in the mixture. Such heavy materials are difficultly desorbable from the adsorbent when the adsorbed fraction of the fluid mixture is desorbed. In adsorption operations involving hydrocarbon gases, heavy constituents which are only difficultly recoverable from the adsorbent may be formed thereon through mechanisms such as polymerization of olefins and diolefins.

Regardless of the mechanism by means of which the heavy materials accumulate on the adsorbent, the effect is to decrease the adsorbent activity due to the fact that residual materials are retained in the pores of the adsorbent thereby limiting the amount of the material adsorbable in subsequent adsorption steps. Heating the adsorbent and the use of stripping agents such as steam or other gases ordinarily suffice to desorb the great majority of the adsorbed constituents. However, when there are such heavy materials in the fluid mixture to be treated, or the mixture is of such a nature that such materials may form during adsorbent treating, the gradual decrease in adsorbent capacity or activity is experienced.

When the contaminating materials are hydrocarbonaceous in nature, as were traces of absorption oil or olefin or diolefin polymers accumulate on the adsorbent, it has been found that treating such a partially deactivated adsorbent at temperatures above about 1000° F. in the presence of a countercurrent flow of steam will return the adsorbent activity in many cases to its former value. A preferential water gas reaction occurs between the deactivating hydrocarbon and the reactivating steam whereby the hydrocarbon material is converted to carbon monoxide and hydrogen leaving the adsorbent substantially free of contaminants and giving it a high adsorption capacity.

While such a reactivation procedure will maintain the activity at the desired value under usual conditions it has been found that the rate of adsorbent activity decline is often in excess of the rate at which the aforementioned reactivation procedure will raise the adsorbent activity in cases where fluid to be separated contains an unusually high proportion of constituents which adversely effect the adsorbent. Thus, countercurrent reactivation of adsorbents is in some cases ineffective to maintain the adsorbent activity at a constant value.

Another problem which occurs and which is a very serious one is the limitation on the quantity of reactivation gas which may be passed countercurrent to a gravity flow of solid granular adsorbent. At increased temperatures the specific volume of the reactivating gas and the viscosity increase. It is known that the pressure drop of such gases through granular masses of solids is proportional to the product of the velocity and the viscosity of the fluid flowing. Consequently, at higher temperatures such as those required to reactivate deactivated granular adsorbents, the quantity of reactivating gas necessary to reactivate the adsorbent cannot be passed through the granular mass without stopping gravity flow of the adsorbent. Under such conditions the maximum amount of reactivating gas which may be passed countercurrently through the adsorbent is so low that valuable desorbable constituents are carried down into the high temperature zone of reactivation without being stripped from the adsorbent. At reactivation temperatures above 1,000° F. often such constituents thermally decompose resulting in further serious contamination of the adsorbent. For example, in hydrocarbon gas separation the $C_5$ to $C_{10}$ hydrocarbons are coked on the adsorbent making reactivation more difficult, whereas with more reactivating gas they could have been stripped off at temperatures well below coking values. Thus, it is found that countercurrent reactivation is satisfactory when the reactivation load is moderate, but under conditions where the adsorbent is deactivated fairly rapidly a more efficient method of adsorbent reactivation is required.

The present invention therefore is directed to an improved process and apparatus by means of which deactivated granular adsorbents may be reactivated efficiently and at high reactivation rates to overcome the disadvantages and retain the advantages of previously proposed reactivation procedures.

It is a primary object of the present invention to improve selective adsorption processes by incorporation of the improved reactivation procedure of the present invention.

Another object is to provide an improved adsorbent reactivation process whereby increased quantities of reactivation gas may contact the adsorbent without solids flow limitation, and wherein full advantage is taken of the elevated temperatures employed.

Another object is to provide for increased efficiency for the recovery of the more readily adsorbable constituents of a fluid mixture which is contacted by a recirculating mass of granular adsorbent to effect separation of the constituents of the fluid mixture.

A more specific object of the present invention is to provide a reactivation process for treatment of granular adsorbents wherein the deactivated adsorbent is indirectly heated and stripped in a preliminary stripping step to recover desorbable constituents just below their decomposition temperature prior to subjecting such deactivated adsorbent to reactivating conditions of pressure and temperature whereby residual contaminating materials are decomposed and removed.

A further specific object of the present invention is to provide a two-stage adsorbent reactivation process in which the adsorbent is countercurrently contacted with a stripping gas at temperatures insufficient to decompose the adsorbed materials in the first stage and subsequently concurrently contacted with a reactivating gas at temperatures above the decomposition temperature of the adsorbed materials which are sufficient to convert such materials into readily desorbable constituents.

It is also an object of the present invention to provide an improved apparatus to carry out the aforementioned objects.

Other objects and advantages of the present invention will become apparent to those skilled in the art as the description thereof proceeds.

Briefly, the present invention comprises, in combination with a selective adsorption process for contacting a fluid mixture of constituents with a solid granular adsorbent, an improved combination process for adsorbent reactivation. In the reactivation operation a preliminary adsorbent stripping step is carried out in the presence of a stripping gas but at an elevated temperature insufficient to cause decomposition of adsorbed materials. The actual upper temperature limit in this preliminary step is determined by the nature of the materials adsorbed on the adsorbent and in hydrocarbon separation processes this upper limit is about 1,000° F. A subsequent reactivation step is carried out at a temperature sufficient to effect a reaction between the residual adsorbed materials and a reactivation gas such as steam. The required temperature in this latter step depends again upon the nature of adsorbed materials, but for adsorbed hydrocarbons a temperature above 1,000° F. and preferably between about 1200° F. and 1800° F. is employed in the presence of a concurrent contact of a reactivation gas. The reactivation gas may comprise flue gas containing a deficiency of oxygen, mixtures of steam and flue gas, mixtures of steam and up to about 5% by volume of air, or steam alone. It is preferable in most cases to use steam by itself, and desirable in cases where an exceedingly high reactivation rate is needed to inject small quantities of air into the reactivation stream of steam. Following the reactivation step it is desirable to cool the reactivated adsorbent prior to returning it to the recirculating stream of adsorbent in the main adsorption operation. This is necessary as it simplifies construction of equipment required to handle reactivated adsorbent as will subsequently be described.

In the preliminary stripping operation and the high temperature reactivation operation indirect heating of the adsorbent is employed by passing the deactivated adsorbent through tubes externally heated by flue gas or equivalent heating media. The subsequent cooling operation may be carried out in a similar fashion by indirect heat exchange or it may be carried out by directly contacting the reactivated adsorbent with a cool gas, such a relatively unadsorbable gas obtained in the adsorption process, low pressure low temperature steam, or other available cooling medium.

The preliminary stripping step comprises an indirect heating of the deactivated adsorbent and a simultaneous countercurrent contact of the adsorbent with a stripping gas whereby the desorbable materials are removed from the adsorbent at a temperature somewhat below that at which thermal decomposition of the desorbable constituents occurs. It has been found that in the preliminary stripping step a concurrent contact of stripping gas and adsorbent may be employed, but that countercurrent contact is preferred since a greater number of theoretical contact stages is permitted between the stripping gas and the heated adsorbent. Another highly important result obtained by the countercurrent preliminary stripping operation is a substantially complete preferential desorption of desorbable constituents and the prevention of their passage into their high temperature reactivator where, were it not for the preceding stripping step, these adsorbed constituents are exposed to temperatures sufficient to decompose them which would further deactivate the adsorbent. Thus, the preliminary stripping step effects an efficient countercurrent contact of stripping gas and adsorbent thereby desorbing the desorbable constituents substantially without decomposition, increases the efficiency of recovery of the more readily adsorbable constituents of the fluid mixture to be separated, eliminates decomposition of adsorbed constituents during the reactivation step, and efficiently preheats the adsorbent to just below reactivation temperatures.

In the reactivation step, temperatures are employed which are sufficient to effect a preferential gasification of heavy deactivating hydrocarbons adsorbed on the adsorbent by means of heating the adsorbent to a temperature above about 1,000° F. and concurrently contacting the adsorbent with a flow of reactivating gas such as steam. Under such conditions, even in the presence of carbon adsorbents, a preferential gasification of adsorbed heavy hydrocarbons occurs to form carbon monoxide and hydrogen which are continuously swept from the reactivator. The rate of reactivation is dependent upon the temperature to which the adsorbent is heated and is also strongly dependent upon the rate of flow of reactivation gas. It has been found that temperatures greater than about 1,000° F. are essential to satisfactory adsorbent reactivation but that even at such temperatures an insufficient quantity of steam, as experienced in countercurrent reactivation, renders any attempted reactivation ineffective. It has been found that temperatures between about 1200° F. and 1800° F. are satisfactory to reactivate adsorbents deactivated by adsorbed hydrocarbon constituents. At such high temperatures the flow rate of steam countercurrent through a moving mass of adsorbent is seriously limited as mentioned above and that with concurrent reactivating steam flow a greatly increased reactivation rate has been found. The increase in permissible steam flow not only introduces a greater quantity of reactivating agent into the spent adsorbent but also effectively dilutes the products of reactivation so that a maximum partial pressure of reactivating agent is maintained throughout the reactivation zone.

The materials of construction in the preliminary heating step and the reactivation step must of course be able to withstand the pressure of operation at the elevated temperatures of reactivation. In the preliminary stripping section it has been found that stainless steel tubes are satisfactory and that in the reactivation zone stainless steel or other nickel and chromium alloy tubes are satisfactory. Since the reactivated adsorbent discharges from the reactivation zone at temperatures of the order of 1600° F. the conduits for returning the reactivated adsorbent to the main recirculating adsorbent stream must be either fabricated of similar heat resistant materials or a cooling zone provided to reduce the temperature sufficiently that ordinary mild steel will withstand the temperature and pressure conditions. As subsequently described in connection with the drawing, a feeder mechanism is necessary to control the rate of flow of adsorbent through the stripping and reactivation zones and it has been found preferable to provide a cooling zone following the reactivation zone rather than to fabricate the feeding mechanism and associated conduits of heat resistant alloy steels.

Thus, in the improved adsorbent reactivation operation of the present invention the deactivated adsorbent is passed first through a preliminary high temperature stripping zone wherein the adsorbent is countercurrently contacted with a stripping gas forming a partially reactivated adsorbent. Subsequently, at least part of this adsorbent is passed through a reactivation zone at still higher temperatures and subjected to a concurrent flow of reactivation gas to form a hot reactivated adsorbent. Then the adsorbent is preferably passed through a cooling zone lowering the temperature to about 750° F. or below, passed through an adsorbent feeding or flow controlling mechanism, and returned to the main recirculating adsorbent stream in the associated adsorption process.

The invention will be more clearly understood from reference to the accompanying drawings in which:

Figure 1 illustrates an elevation view in cross section of a selective adsorption process in combination with the adsorbent reactivation steps described above, and Figure 2 shows an elevation view in cross section of a modified reactivator which may be substituted for the one shown in Figure 1.

Referring now more particularly to Figure 1, selective adsorption column 10 is shown provided at successively lower levels therein with hopper zone 12, absorbent cooling zone 14, lean gas disengaging zone 16, adsorption zone 18, feed gas engaging zone 20, primary rectification zone 22, side cut product disengaging zone 24, secondary rectification zone 26, rich gas product disengaging zone 28, preferential desorption zone 30, adsorbent heating zone 32, stripping gas engaging zone 34, adsorbent flow control zone or adsorbent feeder zone 36, and bottom zone 38. Adsorbent cooling zone 14 and adsorbent heating zone 32 are tube bundles positioned between parallel tube sheets with the adsorbent passing through the tubes and heat transfer media circulated outside of the tubes. Engaging and disengaging zones 16, 20, 24, 28, and 34, and other engaging and disengaging zones or sections subsequently described in connection with the reactivation of granular adsorbent, consist of horizontal trays or plates filling the entire cross section of the column and provided with depending tubes through which the adsorbent passes downwardly and around which, and below the plate, a free gas space is formed. Granular adsorbent is introduced into the top of column 10 and passed downwardly by gravity as a substantially compact moving bed of adsorbent successively through the aforementioned zones.

The rate of granular solids flow through column 10 is maintained by means of feeder zone 36 which consists of upper stationary tray 40, intermediate movable tray 42, and lower perforated tray 44. By reciprocating tray 42 first so that the tubes thereof are aligned with the depending tubes of stationary tray 40, and second so that they are aligned with perforations in lower perforated tray 44, the tubes of tray 42 are alternately filled with adsorbent from above and subsequently emptied into bottom zone 38. The frequency of reciprocation of movable tray 42 directly determines the adsorbent circulation rate through the column.

Granular adsorbent collecting in bottom zone 38 passes downwardly through sealing leg 46 into adsorbent control valve zone 48 wherein by means of movable plate 50 actuated by valve head works 52 in conjunction with level control 54 the flow rate of granular solids from bottom zone 38 through sealing leg 46 is maintained the same as the granular solids flow rate through adsorbent feeder 36 thereby maintaining the solids level in zone 38 at a constant position. From zone 48 the adsorbent passes via transfer line 54 controlled by valve 56 into induction zone 58 which consists of lower conveyance fluid inlet zone 60 and upper adsorbent inlet zone 62. A conveyance fluid under pressure exerted by blower 64 is injected via line 66 controlled by valve 68 into zone 60. This fluid then passes upwardly into solids inlet zone 62 forming a suspension of the granular adsorbent and carrying the resulting suspension via conveyance zone 70 into impactless separator zone 72. Herein the suspension is broken and the solids and the conveyance fluid pass as substantially independent streams via transfer line 74 provided with baffle 76 into hopper zone 12 at the top of adsorption zone 10. Because of the conveyance fluid velocity existing in the upper portion of column 10 adsorbent fines remain suspended while the larger particles settle in hopper zone 12. A suspension of undesirable adsorbent fines in recirculating conveyance fluid is removed via line 78 controlled by valve 80 and recirculated via conveyance fluid return line 82 to blower 64. By means, not shown, this recirculating fluid is continuously treated for the removal of adsorbent fines so that the gas introduced into blower 64 is substantially fines free.

A gaseous mixture, consisting of constituents of low, intermediate and high degrees of adsorbability, is introduced via line 84 controlled by valve 86 into the lower part of adsorption zone 18. The gaseous mixture is contacted countercurrently with a moving bed of adsorbent therein forming a rich adsorbent containing constituents of intermediate and high adsorbability together with a small portion of constituents of low adsorbability leaving a substantially unadsorbed gas consisting of constituents of low adsorbability. The unadsorbed gas is partly removed from lean gas product disengaging zone 16 via line 88 controlled by valve 90. The remaining portion passes upwardly countercurrent to cooling adsorbent in cooling zone 14 as a purge gas serving to strip residual quantities of stripping gas from the adsorbent and to presaturate the lean adsorbent in the cooling zone with lean gas constituents while dissipating the heat of adsorption. The purge gas then is recirculated as the conveyance fluid described above. Accumulations in the conveyance fluid recycle are removed therefrom via line 92 at a rate controlled by valve 94.

The rich adsorbent formed in adsorption zone 14 subsequently passes through feed gas engaging tray 20 into primary rectification zone 22. Herein the rich adsorbent is countercurrently contacted with a reflux of intermediate constituents thereby preferentially desorbing the small quantity of adsorbed less readily adsorbable constituents which rise into adsorption zone 18. A partially rectified adsorbent containing only constituents of intermediate and high adsorbability is thus formed.

The partially rectified adsorbent then passes into secondary rectification zone 26 wherein it is contacted with a rich gas reflux consisting of constituents of high adsorbability. The intermediate constituents are thereby preferentially desorbed and pass upwardly into side cut gas product disengaging zone 24. A portion of the thus desorbed intermediate constituents are removed via line 96 at a rate controlled by valve 98 in accordance with temperature recorder controller 100 whereby the remaining portion is passed as reflux into primary rectification zone 22 as described above.

The rectified adsorbent formed in secondary rectification zone 26 passes next into preferential desorption zone 30 wherein the adsorbent is countercurrently contacted with a preferentially adsorbed stripping gas thereby desorbing the constituents of high adsorbability forming a rich gas product and a partially stripped adsorbent. A portion of the thus desorbed gas is removed therefrom via line 102 at a rate controlled by valve 104 in accordance with temperature recorder controller 106 whereby the remaining portion is passed as said rich gas reflux into secondary rectification zone 26 as described above. The partially stripped adsorbent remaining in preferential desorption zone 30 then passes through the tubes of heating zone 32 wherein it is indirectly heated and countercurrently contacted with further quantities of a stripping gas introduced into engaging zone 34 via line 108 at a rate controlled by valve 110. Most of the remaining adsorbed constituents are stripped from the adsorbent in heating zone 32 and produced as a rich gas product together with the stripping gas via line 102 as described above. The granular adsorbent, lean and hot, is subsequently conveyed as described to cooling zone 14 at the top of the column wherein the adsorbent is cooled and contacted subsequently with further quantities of the gaseous mixture to be separated.

A portion ranging from between about 1% and 20% of the recirculating adsorbent stream is removed from transfer line 74 at a point upstream from the baffle 76 for continuous reactivation according to the methods of the present invention. This adsorbent passes via transfer line and sealing leg 112 at a rate controlled by valve 114 into reactivation column 116. The reactivation column is provided at successively lower levels therein with desorbed product primary disengaging zone 118, heating zone 120, desorbed product secondary disengaging zone 122, secondary stripping zone 124, stripping and reactivation gas engaging zone 126, reactivation zone 128, cooling zone 130 and reactivation effluent disengaging zone 132. The reactivated adsorbent is subsequently passed via sealing leg 134 controlled by valve 136 through feeder zone 138 and subsequently via transfer line 140 controlled by valve 142 into transfer line 54 for combination with the recirculating adsorbent.

Reactivation zone 128 is provided with heating inlet 144 whereby flue gases or other heating media pass through zone 128 and are removed via line 146. A portion thereof passes subsequently through zone 120 and being cooler, heats the adsorbent therein to a lower temperature. The quantity of flue gas passing through zone 120 is controlled by valve 148 in flue gas outlet line 150. The remaining portion of flue gases is vented or recirculated to flue gas inlet 144 via line 152 controlled by valve 154. The relative quantity of flue gas passing through zones 120 and 128 is controlled so that the adsorbent in zone 120 is heated to an elevated temperature below that which results in thermal decomposition of adsorbed materials. Under such conditions of temperature a maximum quantity of desorbable materials is desorbed without decomposition by the countercurrent portion of stripping gas introduced via line 156 controlled by valve 158 which passes countercurrent to adsorbent in zones 120 and 124. Because of the absence of tubes in zone 124, a greater quantity of the countercurrent stream may pass without inhibiting adsorbent flow through zone 124 for removal via line 160 controlled by valve 162 while the residual portion of the countercurrent stream passes on through the tubes of zone 120 and is removed via line 164 at a rate controlled by valve 166.

The stripped and partially reactivated adsorbent thus formed then passes concurrently with the concurrent stream of reactivating gas through reactivating zone 128 wherein the adsorbent is heated to a temperature sufficient to effect decomposition of the residual constituents on the adsorbent. With hydrocarbon or carbonaceous adsorbed materials, carbon monoxide and hydrogen are formed by gasification and are swept from the reactivation zone. A hot reactivated adsorbent results which subsequently passes into cooling zone 130. Inlets and outlets 168 and 170 are provided for indirectly cooling the adsorbent to a temperature below about 750° F. Such a temperature is high enough so that the concurrent stream of reactivating steam does not condense under ordinary pressures of operation and is removed as a vapor stream via line 172 at a rate controlled by valve 174 from zone 132. The adsorbent is at a sufficiently low temperature so that it may safely be handled in mild steel apparatus and is removed from the bottom of reactivator column 116 and returned as described to the main recirculating adsorbent stream in adsorption column 10.

Referring now more particularly to Figure 2, a modification of the reactivation column of Figure 1 is shown wherein analogous parts are indicated by the same numbers. In this modification provision is made for treating all of the deactivated adsorbent to a high temperature stripping operation and a portion thereof to the reactivation operation. In this modification, spent or deactivated adsorbent is conveyed via transfer line and sealing leg 112 controlled by valve 114 into secondary stripping vessel 176. Herein the adsorbent passes downwardly through desorbed product disengaging zone 118 and subsequently through the tubes of secondary heating zone 120. The granular adsorbent is heated and countercurrently contacted by a stripping gas such as steam introduced via line 180 at a rate controlled by valve 182 into stripping gas engaging zone 184. The stripping gas passes countercurrent to the descending adsorbent stripping desorbable constituents therefrom leaving a partially reactivated preheated adsorbent. This adsorbent is conveyed from the bottom of column 176 via line 186 and a portion thereof is by-passed via line 188 controlled by valves 190 and 192 around reactivator column 194 while the remaining portion is passed via line 196 controlled by valve 198. The adsorbent thus introduced passes downwardly through reactivation gas engaging zone 200 into which a reactivation gas such as steam is introduced via line 202 at a rate controlled by valve 204. The adsorbent passes downwardly through the tubes of reactivation zone 128 concurrently with the reactivation gas. As before, flue gases are introduced via line 144 at temperatures sufficient to heat the adsorbent to the reactivation temperatures. A portion thereof may be removed via line 206 controlled by valve 208 for recirculation to the flue gas generator or for venting to the atmosphere. The remaining portion is passed via line 146 controlled by valve 178 into preheating zone 120.

The hot reactivated adsorbent and reactivation gases pass from reactivation zone 128 into disengaging zone 210 into cooling zone 130. If desired, a portion of the reactivation gases may be removed from zone 210 via line 212 controlled by valve 214 while the remainder passes concurrently with the adsorbent through cooling zone 130. In the latter zone, the hot reactivated adsorbent is cooled to temperatures which do not damage mild steel materials of construction. The cooled reactivated adsorbent is then passed via line 134 and combined with that portion passed directly from the stripping operation and is subsequently recirculated into the moving mass of granular adsorbent in the main column.

The following data are given to illustrate the improved process for adsorbent reactivation according to the present invention:

Example I

Deactivated coconut charcoal adsorbent employed for the separation of a refinery cracked gas had an activity measured in terms of normal butane adsorption at 60° F. and one atmosphere pressure of 0.31 cubic centimeter (liquid) per gram of adsorbent. This adsorbent was passed at a rate of 3.75 pounds per hour through a reactivator tube 19 feet in length which was externally heated so that the maximum charcoal temperature was 1600° F. The distance within which a charcoal temperature in excess of 1,000° F. existed was about 10 feet and the residence time therein was 31.6 minutes. A countercurrent flow of steam was employed. This charcoal was passed repeatedly nine times through the reactivator tube during which time the adsorbent activity increased to 0.48 cubic centimeter of liquid normal butane per gram of adsorbent or an average increase of 0.019 cubic centimeter per gram per pass.

Example II

In the same reactivator tube, deactivated granular charcoal from the same selective adsorption unit treating cracked refinery gases was treated with a concurrent flow of reactivation steam at a maximum temperature of 1550° F. The activity of the charcoal as it was introduced into the reactivator was 0.39 cubic centimeter of liquid normal butane per gram. The adsorbent was fed at a rate of 3.75 pounds per hour four times through the reactivator tube. At the end of four passes the charcoal activity had increased to 0.51 cubic centimeter of liquid normal butane per gram for an average reactivation rate of 0.03 cubic centimeter per gram per pass.

It is at once apparent that a materially increased reactivation rate was attained in the case where concurrent flow of reactivation steam was employed. In both cases the granular charcoal was stripped countercurrently with steam at a temperature of about 950° F. prior to the reactivation steps.

Example III

A 30 pound batch of deactivated coconut charcoal having an activity of 0.20 cubic centimeter of liquid normal butane per gram was first heated to about 950° F. and countercurrently contacted with stripping steam. A product was obtained from this stripping operation which consisted of about 700 milliliters of about 350° F. end point gasoline. The activity of the thus partially reactivated charcoal was then found to be 0.35 cubic centimeter per gram. The partially reactivated charcoal was subsequently treated at 1600° F. in a concurrent flow of reactivation steam and in four passes through the reactivation zone, each pass having a residence time of about 35 minutes, the activity of the charcoal increased to 0.50 cubic centimeter per gram for an average increased activity of 0.04 cubic centimeter per gram per pass.

From the foregoing examples it is at once apparent that the particular charcoal treating the preliminary stripping operation at 950° F. achieved fully 50% of the adsorbent reactivation and that a valuable gasoline product was recovered. The remaining 50% of activity increase was obtained by a water-gas reaction between steam and adsorbed nondesorbable hydrocarbons present on the adsorbent thereby converting these components to carbon monoxide and hydrogen predominantly. It has been previously found that failure to desorb such desorbable constituents prior to a high temperature reactivation step materially increases the difficulty of reactivation since thermal decomposition of the desorbable constituents exemplified by the 700 milliliters of gasoline recovered in Example III results in the deposition of coke on the adsorbent making it considerably more difficult to reactivate than if hydrocarbons were present on the adsorbent. An obvious other advantage is that under these particular operating conditions named in Example III a gallon of gasoline may be recovered from every 162 pounds of deactivated adsorbent treated; whereas, if the reactivation process of the present invention were continuously in operation such a gasoline recovery would not be experienced. It is also quite obvious that an appreciable quantity of gasoline may be recovered as a by-product in selective adsorption plants circulating 200,000 to 300,000 pounds per hour of adsorbent in addition to the desirable results being obtained from maintaining high adsorbent activity.

The improved process of the present invention applies equally well to activated charcoal adsorbent as well as to adsorbents such as silica gel, activated aluminum oxide, and the other well known solid granular adsorbents.

The process of the present invention applies particularly well to the cases wherein the charcoal or other adsorbents are employed in the treatment of hydrocarbon fluids since it has been found that a very desirable selective reactivation may be obtained whereby the deactivating residual nondesorbable hydrocarbon may be preferentially destroyed without undue reaction with the charcoal adsorbent. In cases where selective adsorption processes are employed to treat nonhydrocarbon gaseous mixtures and wherein residual constituents deactivate the adsorbent, an appropriate reactivating gas may be employed incorporating the principles of the present invention to similarly reactivate such materials.

With particular reference to spent adsorbent deactivated in the treatment of hydrocarbon fluids, it is preferred to operate the preliminary stripping operation at temperatures ranging up to 1,000° F. and to carry out the reactivation step at temperatures between about 1,000° F. and 2,000° F. with temperatures between about 1200° F. and 1800° F. being preferred.

The pressure of operation of the reactivation step of the present invention is preferably the same as the adsorption operation, although if desired, higher or lower pressures may be employed. By isolating the reactivation operation from the main operation by means of pressure seals the high temperature stripping and reactivation steps may be carried out at considerably lower pressures such as subatmospheric, if desired.

In particularly serious cases of adsorbent deactivation the activity may be more rapidly increased by the incorporation of small quantities of an oxygen-containing gas in the concurrent reactivation contact, such as from 0.01% to as high as 10% by volume of air. In this manner somewhat decreased reactivation temperatures are permissible in the ordinary reactivation operations and at the same temperatures increased reactivation rates are experienced.

In the selective adsorption separation of hydrocarbon gas mixtures containing hydrogen sulfide, carbonyl sulfide, carbon disulfide and other such sulfur-bearing gases occurring in hydrocarbon mixtures, these gases may be contacted with a moving bed of adsorbent as above described in the presence of a small quantity of an oxygen-containing gas whereby the sulfur compounds are oxidized precipitating elemental sulfur as a deactivating agent on the adsorbent. A stoichiometric proportion of air is preferably added to secure this result. The sulfur thus produced is desorbable under the conditions at which the adsorbent is reactivated and often will appear with the effluent from the preliminary stripping operation. In such a manner at least a partial desulfurization of hydrocarbon gases to be separated is effected by means other than preferential adsorption of the hydrocarbon constituents from the sulfur-containing constituents. Similarly sulfur may be so produced from an adsorbent when it is employed to adsorptively treat gas mixtures generated in sulfur burning operations for sulfur dioxide and sulfur trioxide preparation.

*Example IV*

Deactivated charcoal adsorbent employed in a gas separation process is deactivated by the accumulation thereon of sulfur. In one case as much as 19.3% by weight of sulfur is held on the adsorbent. Upon heating such deactivated charcoal in a downflow of superheated steam it is found that at 650° F. elemental sulfur is evolved slowly, at 750° F. it is evolved in large quantities of fine dust in the steam discharge, and that at 800° F. and higher molten sulfur flows from the reactivator outlet with the steam. Heating to 1,000° F. and steam treatment reduces the sulfur content to 1.0% by weight and restores the charcoal activity to 89.7% of the fresh charcoal. Resaturation with sulfur and reactivation as above described gives no substantial change in activity from the 89.7% figure given. Thus it is shown that adsorbents deactivated by sulfur deposition in the presence of oxygen and sulfur-containing constituents may be reactivated according to the principles of this invention.

It is indicated that by employing one or more baffles in the transfer line from which adsorbent is withdrawn for reactivation that at least a partial classification according to density is obtained whereby the more dense less active granules have a tendency to accumulate on the lower surface thereof. By withdrawing, as above described, a portion of adsorbent from this lower surface a stream of adsorbent is obtained which is enriched in deactivated adsorbent granules thereby subjecting that portion of the circulating adsorbent stream to reactivation which is most deactivated. Another important function of the baffle is to maintain an upper transfer line and sealing leg leading from the source of adsorbent to the reactivation vessel full of granular adsorbent thereby preventing undue gas flow between the adsorption and reactivation columns.

In some selective adsorption operations the fluid to be treated is entirely free from constituents which are non-desorbable from the adsorbent and reactivation is not required. The great majority of such fluids, however, contain constituents which over a period of time tend to deactivate the adsorbent and decrease its capacity to adsorb the more readily adsorbable constituents of the fluid to be treated. In such cases reactivation of the adsorbent in varying degrees of severity is required. In the usual case between about 1% and 5% of the circulating stream of adsorbent is separately reactivated according to the principles of the present invention, but as high as 20% or higher, if necessary, may be so reactivated.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the removal of a plurality of fluid constituents having differing degrees of adsorbability adsorbed on a recirculating moving bed of solid granular adsorbent which comprises first indirectly heating the rich fluid-saturated adsorbent containing the adsorbed constituents while directly contacting the same with a stream of stripping gas thereby desorbing the major portion of said adsorbed fluid constituents as a rich gas product leaving a stripped adsorbent containing a minor portion of residual materials adsorbed thereon including desorbable most readily adsorbable constituents and undesorbable deactivating constituents, subsequently indirectly heating part of said stripped adsorbent to a temperature above that at which said rich gas product was desorbed but insufficient to thermally decompose the adsorbed residual materials thereon while countercurrently contacting said stripped adsorbent with a second flow of stripping gas thereby desorbing said residual desorbable constituents and removing the same from said adsorbent as a separate product leaving a partially reactivated adsorbent containing residual nondesorbable deactivating constituents, then indirectly heating at least part of said partially reactivated adsorbent to still higher temperatures sufficient to thermally decompose said residual deactivating constituents, concurrently contacting the thus heated adsorbent with a third flow of stripping gas thereby forming volatile decomposition products of said residual nondesorbable deactivating constituents leaving a reactivated adsorbent, subsequently cooling said reactivated adsorbent to a temperature below about 750° F., and returning the cool reactivated adsorbent to said recirculating moving bed of adsorbent.

2. A process for the recovery of a plurality of hydrocarbons having differing degrees of adsorbability from a recirculating moving bed of solid granular adsorbent which comprises first indirectly heating the rich hydrocarbon saturated adsorbent while directly contacting the same with steam thereby desorbing the major portion of said adsorbed hydrocarbons as a rich gas product leaving a stripped adsorbent containing a minor portion of residual materials thereon including desorbable most readily adsorbable hydrocarbons and undesorbable deactivating constituents, subsequently indirectly heating part of said stripped adsorbent to a temperature above that at which said rich gas product was desorbed but less than about 1000° F. while countercurrently contacting said stripped adsorbent with a second flow of steam thereby desorbing said desorbable hydrocarbons and separating said hydrocarbons from said adsorbent as a separate product gas leaving a partially reactivated adsorbent containing residual nondesorbable deactivating hydrocarbons, then indirectly heating said partially reactivated adsorbent to temperatures between about 1000° F. and about 2000° F., concurrently contacting the thus heated adsorbent with a third flow of steam to form volatile products from said residual deactivating hydrocarbons leaving a reactivated adsorbent, subsequently cooling said reactivated adsorbent to a temperature below about 750° F., and returning this adsorbent and the remaining part of said stripped adsorbent to said recirculating moving bed of adsorbent.

3. A process according to claim 2 wherein said solid granular adsorbent comprises activated charcoal.

4. A process for the regeneration of a rich hydrocarbon-saturated adsorbent containing a plurality of hydrocarbons having differing degrees of adsorbability adsorbed on a moving bed of solid granular adsorbent which comprises passing said moving bed downwardly by gravity through a primary heating and desorption zone, indirectly heating said rich adsorbent in said desorption zone, directly contacting said adsorbent therein with a first flow of stripping steam to desorb the major proportion of said more readily adsorbable hydrocarbons as a rich gas product leaving a partially stripped adsorbent containing residual adsorbed desorbable hydrocarbons and nondesorbable adsorbent deactivating constituents, separating a fraction of said partially stripped adsorbent, passing said adsorbent downwardly by gravity as a moving bed through a second stripping zone, first indirectly heating said partially stripped adsorbent therein to a temperature greater than the maximum temperature maintained in said desorption zone but less than about 1000° F., countercurrently contacting the thus additionally heated partially stripped adsorbent therein with a second flow of stripping steam to desorb said desorbable residual adsorbed hydrocarbons, removing the thus desorbed hydrocarbons therefrom as a separate product leaving a partially reactivated adsorbent containing nondesorbable residual deactivating materials, passing at least part of said partially reactivated adsorbent downwardly by gravity as a moving bed through a reactivation zone, then heating said partially reactivated adsorbent to temperatures between about 1000° F. and about 2000° F. therein, concurrently contacting the adsorbent therein with a third flow of stripping steam to form volatile decomposition products thereof leaving a reactivated adsorbent, removing said decomposition products therefrom, indirectly cooling the reactivated adsorbent to a temperature below about 750° F., and combining said reactivated adsorbent with said moving bed of granular adsorbent.

5. A process according to claim 4 wherein said solid granular adsorbent comprises activated charcoal.

6. In a selective adsorption process wherein a moving fluid mixture containing a plurality of constituents of differing degrees of adsorbability is contacted with a moving bed of solid granular adsorbent thereby adsorbing the more readily adsorbable constituents thereof to form a rich adsorbent leaving less readily adsorbable constituents substantially unadsorbed as a first fluid product, subsequently heating said adsorbent while contacting the same directly with a stripping gas thereby desorbing the adsorbed more readily adsorbable constituents as a substantially pure second fluid product leaving a lean adsorbent containing residual deactivating constituents, and recirculating said lean adsorbent to contact further quantities of said moving fluid, the improvement which comprises flowing a part of said lean adsorbent containing said residual deactivating constituents successively through a primary stripping zone, a secondary stripping zone, and a reactivation zone, indirectly heating said adsorbent in said primary stripping zone to an elevated temperature above that temperature employed in desorbing said second fluid product but insufficient to cause decomposition of said deactivating constituents, subsequently passing the thus heated adsorbent through said secondary stripping zone, countercurrently contacting the heated adsorbent in said secondary stripping zone with a stripping gas in the absence of indirect heating to liberate desorbable deactivating constituents, passing at least part of said stripping gas and said desorbed constituents therefrom countercurrently in direct contact with adsorbent passing through said primary stripping zone, removing said desorbed deactivating constituents from said primary and secondary stripping zones as another fluid product fraction of said fluid mixture, indirectly heating in said reactivation zone the partially reactivated adsorbent formed in said stripping zones, concurrently contacting the adsorbent therein with a reactivation gas to convert residual nondesorbable deactivating constituents to volatile products leaving a reactivated adsorbent, removing volatile reactivation products and said reactivation gas from said reactivation zone, cooling said reactivated adsorbent, and introducing the cooled reactivated adsorbent into said main recirculating adsorbent stream.

7. In a selective adsorption process wherein a moving fluid mixture containing a plurality of constituents having differing degrees of adsorbability is contacted with a moving bed of solid granular adsorbent thereby adsorbing the more readily adsorbable constituents thereof to form a rich adsorbent leaving less readily adsorbable constituents substantially unadsorbed as a first fluid product, subsequently heating the adsorbent while contacting the same directly with a stripping gas thereby desorbing the adsorbed more readily adsorbable constituents as a substantially pure second fluid product leaving a lean adsorbent containing residual deactivating constituents, and recirculating said lean adsorbent to contact further quantities of said moving fluid, the improvement which comprises passing part of said lean adsorbent by gravity as a moving bed successively through a stripping zone, a reactivation zone, and a cooling zone, indirectly heating said adsorbent in said stripping zone to an elevated temperature above that employed in desorbing said second fluid product but insufficient to cause thermal decomposition of said adsorbed deactivating constituents, countercurrently contacting the thus heated adsorbent with a stripping gas to desorb desorbable deactivating constituents, removing the thus desorbed constituents from said stripping zone as another fluid product fraction of said fluid mixture, flowing partially reactivated adsorbent thus formed subsequently through said reactivation zone, additionally heating the adsorbent indirectly to reactivation temperatures, concurrently contacting the thus heated adsorbent therein with a reactivation gas to convert a substantial proportion of nondesorbable deactivating constituents to volatile products of reactivation forming a reactivated adsorbent, subsequently flowing the reactivated adsorbent through a cooling zone, indirectly cooling the reactivated adsorbent therein, removing at least a portion of said reactivation gas and said volatile products of reactivation from a point between said reactivation zone and said cooling zone, passing the remaining portion thereof concurrently with said adsorbent through said cooling zone, separating the remaining portion from said adsorbent following the indirect cooling step, and combining the reactivated cooled adsorbent with said main recirculating adsorbent stream.

8. A process according to claim 7 wherein said stripping gas and said reactivation gas comprise steam.

9. A process according to claim 8 wherein said reactivation gas contains between about 0.01% and about 10.0% by volume of oxygen.

10. In a selective adsorption process for the adsorptive separation of gaseous mixtures containing a plurality of gaseous constituents having differing degrees of adsorbability wherein a compact moving bed of granular adsorbent is passed through an adsorption zone and a desorption zone, the gaseous mixture to be separated is countercurrently passed through said adsorption zone forming a rich adsorbent and a substantially unadsorbed lean gas product, adsorbed constituents are desorbed as a rich gas product by heating and directly contacting said adsorbent with a stripping gas in said desorption zone forming a lean adsorbent containing absorbed adsorbent deactivating constituents of very high adsorbability, and said lean adsorbent is recirculated to contact further quantities of said gaseous mixture in said adsorption zone, the improvement which comprises separating a portion of lean adsorbent removed from said desorption zone and containing adsorbed residual adsorbent deactivating constituents, passing said portion by gravity as a moving bed into a stripping zone, indirectly heating said adsorbent therein to a temperature above that of said desorption zone but insufficient to cause thermal decomposition of adsorbed residual constituents, simultaneously countercurrently contacting the adsorbent with a stripping gas to strip desorbable residual constituents therefrom forming a partially reactivated adsorbent and another product gas fraction of said gaseous mixture, flowing said partially reactivated adsorbent by gravity as a moving bed from said stripping zone, passing at least a part of said partially reactivated adsorbent by gravity as a moving bed through a reactivation zone, indirectly heating the adsorbent therein to a reactivation temperature sufficient to effect reaction between the reactivating gas and undesorbed residual adsorbent deactivating constituents while concurrently passing said reactivating gas through the adsorbent in said reactivation zone, removing a portion of said reactivating gas and a portion of volatile reactivation products from said reactivation zone, passing reactivated adsorbent by gravity as a moving bed next through a cooling zone concurrently with the remaining portion of said reactivating gas and said volatile products of reactivation, separating said remaining portion of gases from the cooled reactivated adsorbent, combining said reactivated adsorbent with the remaining portion of partially reactivated adsorbent, and subsequently combining the mixture thus formed with the main recirculating adsorbent stream in said selective adsorption process.

11. A process according to claim 10 in combination with the steps of passing adsorbent withdrawn from said main recirculating adsorbent stream through an elongated sealing leg zone into said stripping zone, withdrawing reactivated adsorbent from said cooling zone through an elongated sealing leg zone, and maintaining both sealing leg zones full of substantially compact granular adsorbent.

12. A process according to claim 10 in combination with the steps of maintaining a flowing body of partially deactivated adsorbent in said main recirculating adsorbent stream, and withdrawing a portion thereof to be reactivated from the lower regions of said flowing body of adsorbent thereby removing a fraction of deactivated adsorbent therefrom enriched in deactivated adsorbent particles.

13. In a selective adsorption process wherein a fluid mixture of hydrocarbons having differing degrees of adsorbability is contacted with a moving bed of solid granular adsorbent to adsorb the more readily adsorbable hydrocarbons forming a rich adsorbent leaving the less readily adsorbable hydrocarbons substantially unadsorbed as a first fluid product, subsequently contacting said rich adsorbent with a more readily adsorbable reflux fluid thereby preferentially desorbing adsorbed hydrocarbons of intermediate adsorbability from said rich adsorbent as a second fluid product stream leaving a rectified adsorbent, heating said rectified adsorbent while directly contacting the same with a stripping gas thereby liberating adsorbed hydrocarbons from said adsorbent as a third fluid product stream, and recirculating the lean adsorbent thus formed containing adsorbed residual adsorbent deactivating constituents to contact further quantities of said hydrocarbon fluid, the improvement which comprises the steps of withdrawing a portion of the main recirculating lean adsorbent stream containing residual quantities of adsorbed hydrocarbons which deactivate said adsorbent, passing the thus removed portion of adsorbent through a stripping zone, indirectly heating the adsorbent therein to an elevated temperature above that employed to desorb said third fluid product but below the thermal decomposition temperature of said residual adsorbed hydrocarbon constituents, contacting the thus heated adsorbent therein with a stripping gas to desorb the desorbable portion of adsorbent deactivating hydrocarbon constituents from said adsorbent forming a fourth fluid product of said fluid mixture and a partially reactivated adsorbent, subsequently passing at least part of said partially reactivated adsorbent through a reactivation zone, indirectly heating the adsorbent therein to a temperature greater than the thermal decomposition temperature of said residual hydrocarbon constituents, simultaneously contacting the heated adsorbent with a gas containing steam thereby gasifying said residual hydrocarbons to form carbon monoxide and hydrogen leaving a reactivated adsorbent, subsequently cooling said reactivated adsorbent in the presence of said carbon monoxide and hydrogen, and recombining said reactivated adsorbent with said main recirculating adsorbent stream.

14. A process according to claim 13 wherein said adsorbent is heated to a temperature less than 1,000° F. in said stripping zone, the thus heated adsorbent is countercurrently contacted with steam, the partially reactivated adsorbent is heated in said reactivation zone to temperatures between about 1,000° F. and 2,000° F., and the thus heated adsorbent is concurrently contacted with steam.

References Cited in the file of this patent

UNITED STATES PATENTS

| Number | Name | Date |
|---|---|---|
| 1,599,072 | Allen | Sept. 7, 1926 |
| 1,822,303 | Miller | Sept. 8, 1931 |
| 1,895,062 | Zurcher | Jan. 24, 1933 |
| 2,227,416 | Payne | Dec. 31, 1940 |
| 2,384,311 | Kearby | Sept. 4, 1945 |
| 2,387,936 | Nicholls et al. | Oct. 30, 1945 |
| 2,408,600 | Berg | Oct. 1, 1946 |
| 2,436,495 | Smith | Feb. 24, 1948 |
| 2,436,780 | Simpson | Feb. 24, 1948 |
| 2,461,932 | Smith | Feb. 15, 1949 |
| 2,474,834 | Fontana | July 5, 1949 |
| 2,504,102 | Sorf | Apr. 18, 1950 |
| 2,504,215 | Montgomery et al. | Apr. 18, 1950 |
| 2,581,135 | Odell | Jan. 1, 1952 |
| 2,616,858 | Gillette | Nov. 4, 1952 |

FOREIGN PATENTS

| Number | Country | Date |
|---|---|---|
| 172,074 | Great Britain | Nov. 21, 1921 |
| 935,357 | France | Feb. 2, 1948 |

OTHER REFERENCES

"Hypersorption . . . Process," Berg and Bradley; May 1947, The Petroleum Engineer, pages 115, 116, 118.